United States Patent [19]
Lee et al.

[11] Patent Number: 5,769,541
[45] Date of Patent: Jun. 23, 1998

[54] TEMPERATURE SENSOR FOR AN ICE MAKER

[75] Inventors: Gun Il Lee; Joong Yeop Cho, both of Seoul, Rep. of Korea

[73] Assignee: Samsung Electronics Co., Ltd., Suwon, Rep. of Korea

[21] Appl. No.: 757,547

[22] Filed: Nov. 27, 1996

[30] Foreign Application Priority Data

Dec. 22, 1995 [KR] Rep. of Korea ..................... 95-54800

[51] Int. Cl.[6] .......................... G01K 1/14; G01K 13/12; G01K 1/08; G01K 1/00
[52] U.S. Cl. ...................... 374/141; 374/150; 374/157; 374/208; 248/313; 248/316.7; 62/135
[58] Field of Search ................... 374/208, 141, 374/150, 157; 62/135; 248/313, 316.7

[56] References Cited

U.S. PATENT DOCUMENTS

| | | | |
|---|---|---|---|
| 4,133,509 | 1/1979 | Kalbow et al. | 248/313 |
| 4,142,377 | 3/1979 | Fogt | 62/135 |
| 4,628,699 | 12/1986 | Mawby et al. | 62/137 |
| 5,172,556 | 12/1992 | Oike | 62/353 |

FOREIGN PATENT DOCUMENTS

| | | | |
|---|---|---|---|
| 3701902 | 10/1987 | Germany | 248/316.7 |
| 404203871 | 7/1992 | Japan | 62/135 |
| 404313661 | 11/1992 | Japan | 62/135 |
| 405306867 | 11/1993 | Japan | 62/135 |
| 405306868 | 11/1993 | Japan | 62/135 |
| 2248677 | 4/1992 | United Kingdom | 62/135 |

*Primary Examiner*—Diego F. F. Gutierrez
*Attorney, Agent, or Firm*—Burns, Doane, Swecker & Mathis, L.L.P.

[57] ABSTRACT

An automatic ice-making mechanism for a refrigerator includes a tray having a groove on its bottom surface. A temperature sensor is mounted in the groove. The temperature sensor includes a temperature-sensitive element disposed at a top of the groove, an insulating member disposed beneath the temperature-sensitive element, and a housing pushing the insulating member upwardly against the walls of the groove. The housing has a pair of ribs, each rib carrying a projection that fits into a respective eye formed on the bottom of the tray. The ribs are elastically flexible toward one another to enable the projections to be removed from the eyes.

6 Claims, 8 Drawing Sheets

TEMPERATURE SENSOR FOR AN ICE MAKER

FIELD OF THE INVENTION

The present invention relates generally to an ice maker for a refrigerator. More particularly, it relates to a temperature sensor for an ice maker installed on the outside of an ice making container's base.

BACKGROUND OF THE INVENTION

FIG. 4 depicts a refrigerator having a conventional ice maker. The refrigerator includes a body 1, and freezing and refrigerating compartments 3,4 which are separated by a partition 2. The freezing and refrigerating compartments 3 and 4 are accessible by the opening of two doors 5 and 6 to the freezing compartment 3 and refrigerating compartment 4, respectively. A cooler 7 which produces cold air is provided behind the freezing compartment 3. The cold air produced by the cooler 7 is forcedly circulated within the freezing compartment 3 and the refrigerating compartment 4 by a fan 8 installed in the upper portion of the cooler 7. In order to guide the flow of this cold air, a front plate 9 and a rear plate 10 are installed in front of and adjacent to the fan 8, respectively. Cut from the front plate 9 is an outlet 11 which discharges the cold air into the freezing compartment 3, and at the rear plate 10 originates a duct 12 which supplies the cool air into the refrigerating compartment 4.

An ice maker 20 is mounted in the freezing compartment 3, and utilizes the cold air generated by the cooler 7 to turn water into ice. The ice maker 20 consists of an ice making tray or container 21 having a plurality of concave portions 21', which hold the water as it freezes, and an ice reservoir 22, which houses the ice cubes made in the ice making container 21. Further, a water reservoir 23 and a water supply pump 24 are provided for supplying water contained in the water reservoir 23 to the ice making container 21 in the refrigerating compartment 4. A hose 25 is disposed to extend from the water reservoir 23 to the upper portion of the ice making container 21. Through the hose 25 water from the water reservoir 23 is fed to the ice making container 21. An operating member 26 is provided at the front of the ice making container 21, and serves to cause the ice cubes inside the ice making container 21 to be transferred to the ice reservoir 22. It does this by twisting the ice making container 21 at an angle of approximately 135° after completing the ice make mode. In such an ice maker 20 the water supplying, the ice making and the ice dropping modes are carried out automatically and sequentially by a control portion (not illustrated).

As shown in FIG. 6, a temperature sensor 30 is provided on the outside bottom of the ice making container 21 to sense whether or not the water in the ice making container 21 has frozen during the ice making mode.

FIG. 5 is an exploded view of the conventional temperature sensor 30. This temperature sensor 30 includes a temperature-sensitive portion 31 for sensing the temperature of the ice making container 21 temperature, an insulating member 32 made of styrene foam which encases the temperature-sensitive portion 31 in order to prevent ambient air from contacting the temperature-sensitive portion 31, a plate member 33 accommodating the temperature-sensitive portion 31 and the insulating member 32, and a spring 34 disposed outside of the plate member 33 and joined to the outside of the base of the ice making container 21 base to separably fix the above members 31, 32 and 33 to the ice making container 21.

As shown in FIG. 6, the ice making container 21 has two rows of concave portions 21'in which ice cubes are made. Each of the concave portions is trapezoidal in profile and tapers with depth. Thus, the outside bottom of the ice making container has a groove 28 between each of the concave portions 21'. The groove 28 formed by the two longitudinal rows of concave portions 21'is used to accommodate the temperature sensor 30 lengthwise. The bottoms of the concave portions 21a and 21b each have projections 36 disposed oppositely respective to each other with eyes 35 into which the S-shaped spring 34 is fitted.

Thus, the temperature-sensitive portion 31, the insulating member 32 and the plate member 33 are installed in the groove 28 in sequence, and both free ends of the S-shaped spring 34 are then respectively inserted into the corresponding eyes 35 of the projections 36 in such a manner that the temperature sensor 30 is fixed to the outside of the base of the ice making container.

Since the conventional temperature sensor 30 is fixed in place by the spring 34, the conventional temperature sensor supporting structure requires a relatively large number of parts and is large in size. Consequently, the structure of the temperature sensor 30 is complicated and consumes much space.

Additionally, the repetition of the ice dropping mode (the dropping of the ice cubes made in the ice making container 21 onto the ice reservoir 22 by twisting the ice making container 21 over a long period of time distorts the shape of the insulating member 32. This allows the cold air of the freezing compartment to contact the temperature-sensitive portion 31. Furthermore, an excessive compression force of the spring 34 can cause the insulating member 32 to break, thereby allowing the cold air of the freezing compartment 3 to contact the temperature-sensitive portion 31. This contact, as facilitated by either of the above events, precludes the temperature-sensitive portion 31 from accurately detecting the temperature of the ice making container 21.

In summary, after the ice maker 20 equipped with such a conventional temperature sensor 30 is used for a long period of time, it cannot perform the ice making mode effectively due to the malfunction of the temperature sensor 30.

Based on the above and foregoing, it is evident that there presently exists a need in the art for a temperature sensor supporting structure which overcomes the above-described disadvantages, drawbacks, and shortcomings of presently available systems. The present invention fulfills this need.

SUMMARY OF THE INVENTION

It is an object of the present invention to provide a temperature sensor for an ice maker which prevents ambient cold air from contacting a temperature-sensitive portion with the repetition of an ice dropping mode, thereby allowing the temperature-sensitive portion to perform the temperature-sensing operation without error. It is another object of the present invention to provide a temperature sensor for an ice maker which has a small number of components and is of simple construction so that it can be easily attached to an ice making container.

In order to obtain these objects, the inventive temperature sensor for an ice maker, which has an ice making container with a plurality of concave portions for making ice cubes and is installed in a freezing compartment of a refrigerator, includes a groove formed between the concave portions on the outside of the ice making container's base; a temperature-sensitive portion fitted in the groove; a housing protectively encasing the temperature-sensitive portion; and a pair of bosses with eyes formed on the outside bottoms of two of the concave portions oppositely disposed respective to each other.

The housing has on both its sides ribs of flexible material, each having projections fitting into the corresponding eyes of the bosses. The projections can be separated from the eyes of the bosses by bending the ribs toward each other. Also, the housing includes an insulating member used for insulating the temperature-sensitive portion from ambient air in the freezing compartment and a reinforcing member allowing both ends of the insulating member to come in close contact with the outside walls of the concave portions.

DETAILED DESCRIPTION OF THE PREFERRED EMBODIMENTS

The preferred embodiments of the present invention will now be described in detail with reference to the accompanying drawings.

Figure 1:
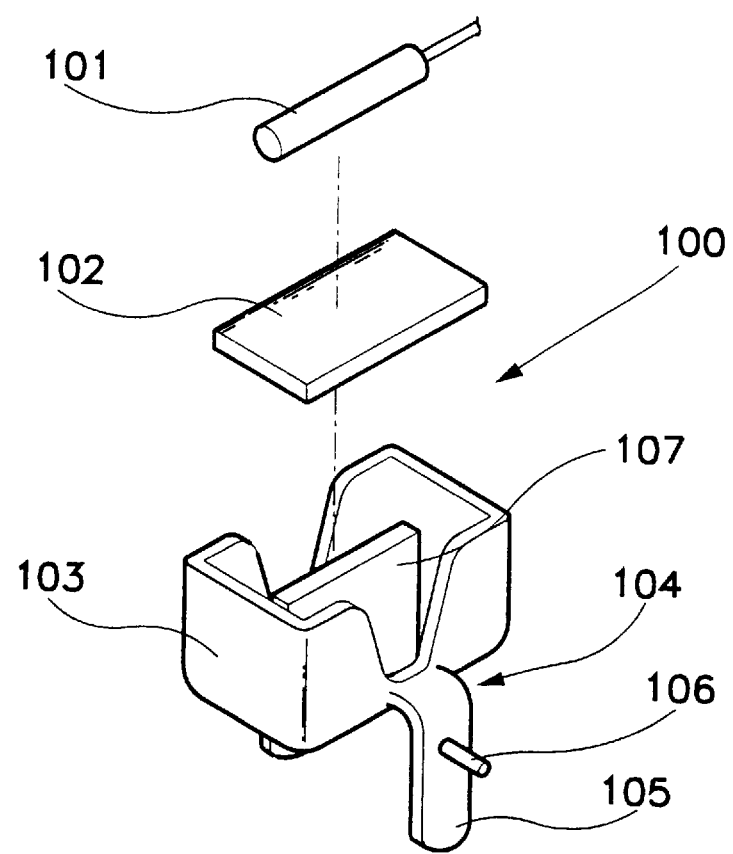
FIG. 1 is an exploded-perspective view of a temperature sensor used for an ice maker according to the first preferred embodiment of the present invention.
Figure 1A:
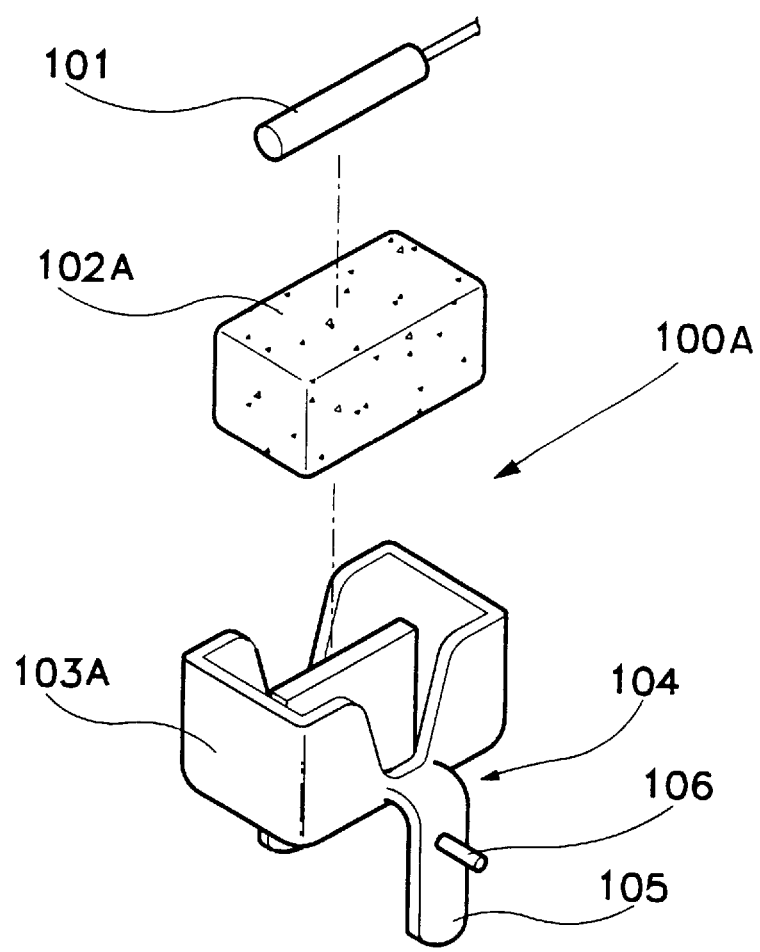
FIG. 1A is an exploded-perspective view of a temperature sensor used for an ice maker according to the second preferred embodiment of the present invention.

FIGS. 1 and 1A respectively depict temperature sensors 100, 100a used for an ice maker according to first and second preferred embodiments of the present invention.

A temperature sensor 100 shown in FIG. 1 includes a cylindrically-shaped temperature-sensitive portion 101, an insulating member 102 that prevents ambient air from contacting the temperature-sensitive portion 101, a housing 103 that accommodates the temperature-sensitive portion 101 and the insulating member 102, and coupling members 104 that extend downward from both sides of the housing 103, allowing the temperature sensor 100 to be easily joined to and disjoined from the outside of the base of the ice making container 50.

The insulating member 102 is made from a flexible material such as sponge in order to prevent it from being broken by the twisting of the ice making container 50. The housing 103 integral with the coupling members 104 and has an open upper portion through which the temperature-sensitive portion 101 and the insulating member 102 can be housed. A reinforcement 107 vertically extends from the base of the housing 103 to the open upper portion.

Figure 2:
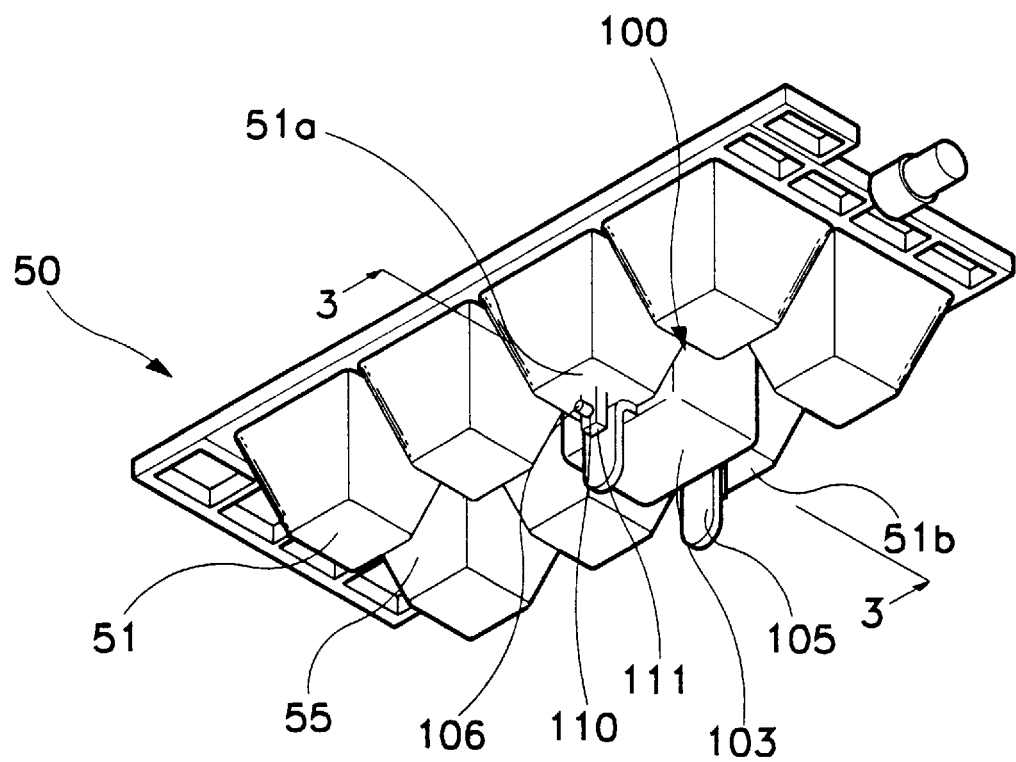
FIG. 2 is a perspective view of an ice making container with the temperature sensor of FIG. 1 attached to the underside of its base.

The respective coupling members 104 are made from an elastic material, and include a pair of ribs 105 extending downward from both sides of the housing 103 and serving as knobs, and a pair of projections 106 horizontally protruding outward from each rib 105. In FIG. 2 the ice making container 50 has two rows of concave portions 51 with a groove 55 formed between them on the outside surface of its base into which the temperature sensor 100 fits. One concave portion 51a of the first row and one concave portion 51b of the second row opposite the concave portion 51a each have bosses 111 with eyes 110 into which the projections 106 of the coupling members 104 are inserted so as to fasten the temperature sensor 100 to the groove 55. The projections 106 of the coupling members 104 can be separated from the corresponding eyes 110 of the bosses 111 by bending them toward each other.

Figure 3:
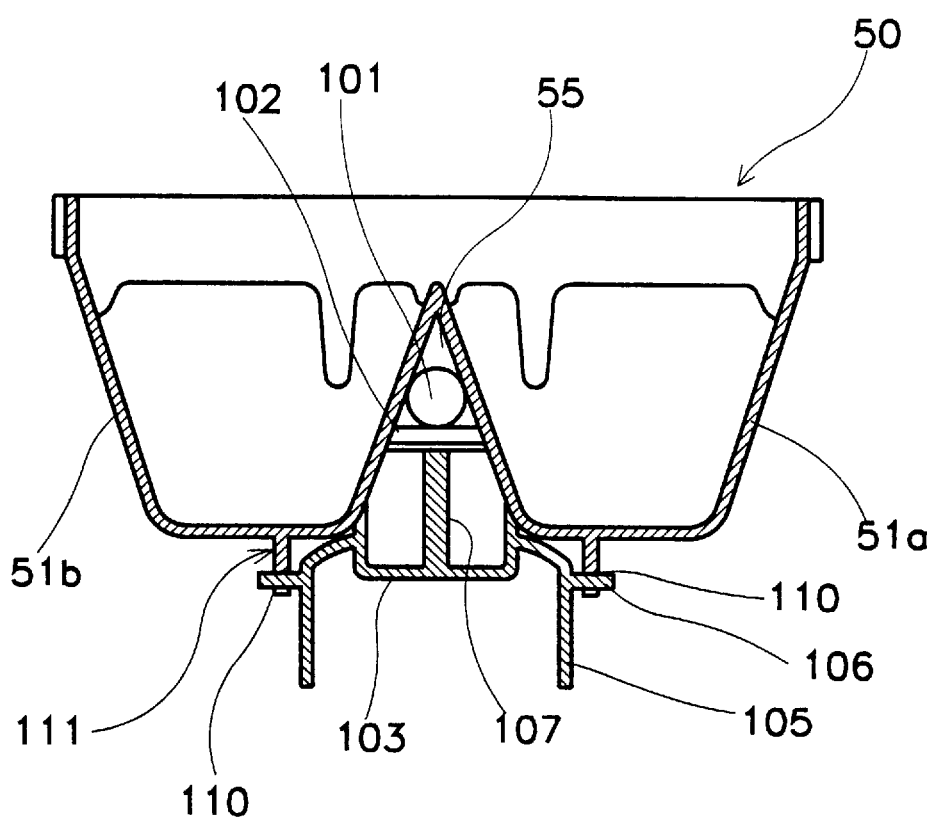
FIG. 3 is a sectional view taken along line 3—3 in FIG. 2.

Referring to FIG. 3, the assembling process of the temperature sensor 100 will now be described in detail.

The assembling process begins with fitting the temperature-sensitive portion 101 into the groove 55 lengthwise. The insulating member 102 is then inserted into the groove 55. As the housing 103 is forced into the groove 55 by using the respective ribs 105 of the coupling members 104, the reinforcement 107 disposed inside the housing 103 pushes the insulating member 102 inward so that the insulating member 102 isolates the groove 55 accommodating the temperature-sensitive portion 101 from the outside.

In this manner, the temperature-sensitive portion 101 can be effectively insulated from ambient air. The temperature-sensitive portion 101 comes into close contact with the ice making container 50 so that it accurately measures the temperature of the ice making container 50. The projections 106 are inserted into the corresponding eyes 110 of the bosses 111 by pressing the pair of ribs 105 of the coupling members 104 toward each other, thereby completing the assembling process.

After the concave portions 51 of the ice making container 50 are filled with water, the water freezes forming ice cubes by the cold air circulated within the freezing compartment 3. A control portion (not illustrated) determines if the ice making mode has been completed on the basis of the temperature of the ice making container 50 as detected by the temperature-sensitive portion 101.

Once the ice making mode is completed, the control portion actuates a motor provided in a driving portion 26 which rotates a rotary gear (not illustrated) to thereby twist the ice making container 50 at an angle of approximately 135 0 in order to drop the ice cubes from the ice making container 21 into an ice reservoir 22. In the inventive temperature sensor 100, the insulating member 102, the housing 103 and the coupling members 104 are all made from flexible materials, so they are not damaged even if the above operation is repeated numerous times.

The disassembly of the temperature sensor 100, whether for inspection or replacement, is accomplished by the simple action of pressing the ribs 105 of the coupling members 104 toward each other so that the projections 106 can be separated from the eyes 110.

Figure 3A:
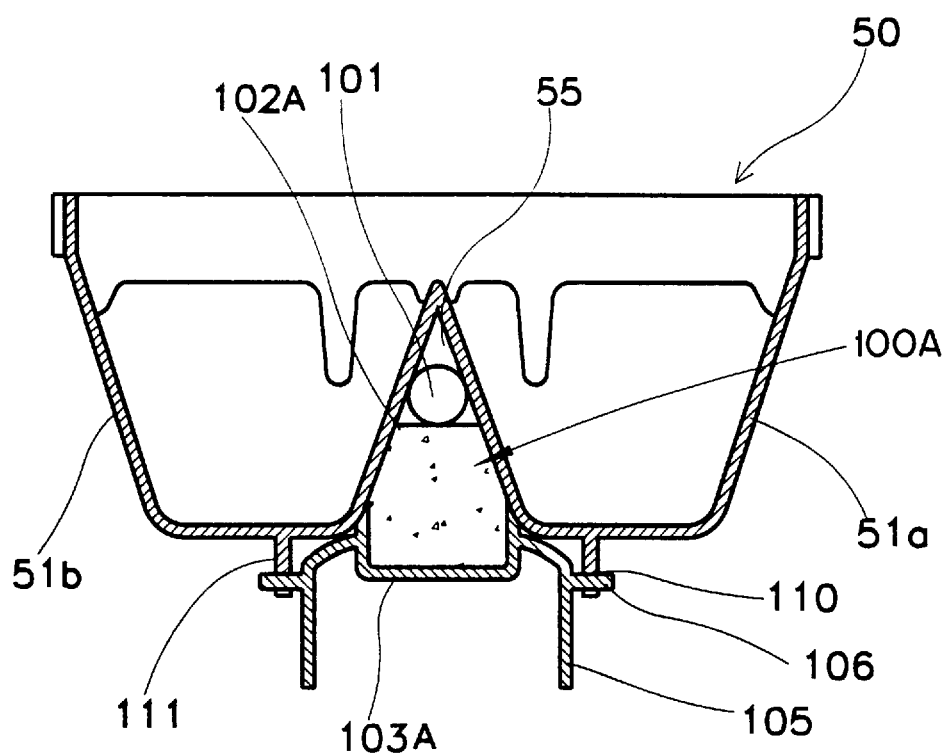
FIG. 3A is a sectional view of a temperature sensor of FIG. 1A.
Figure 4:
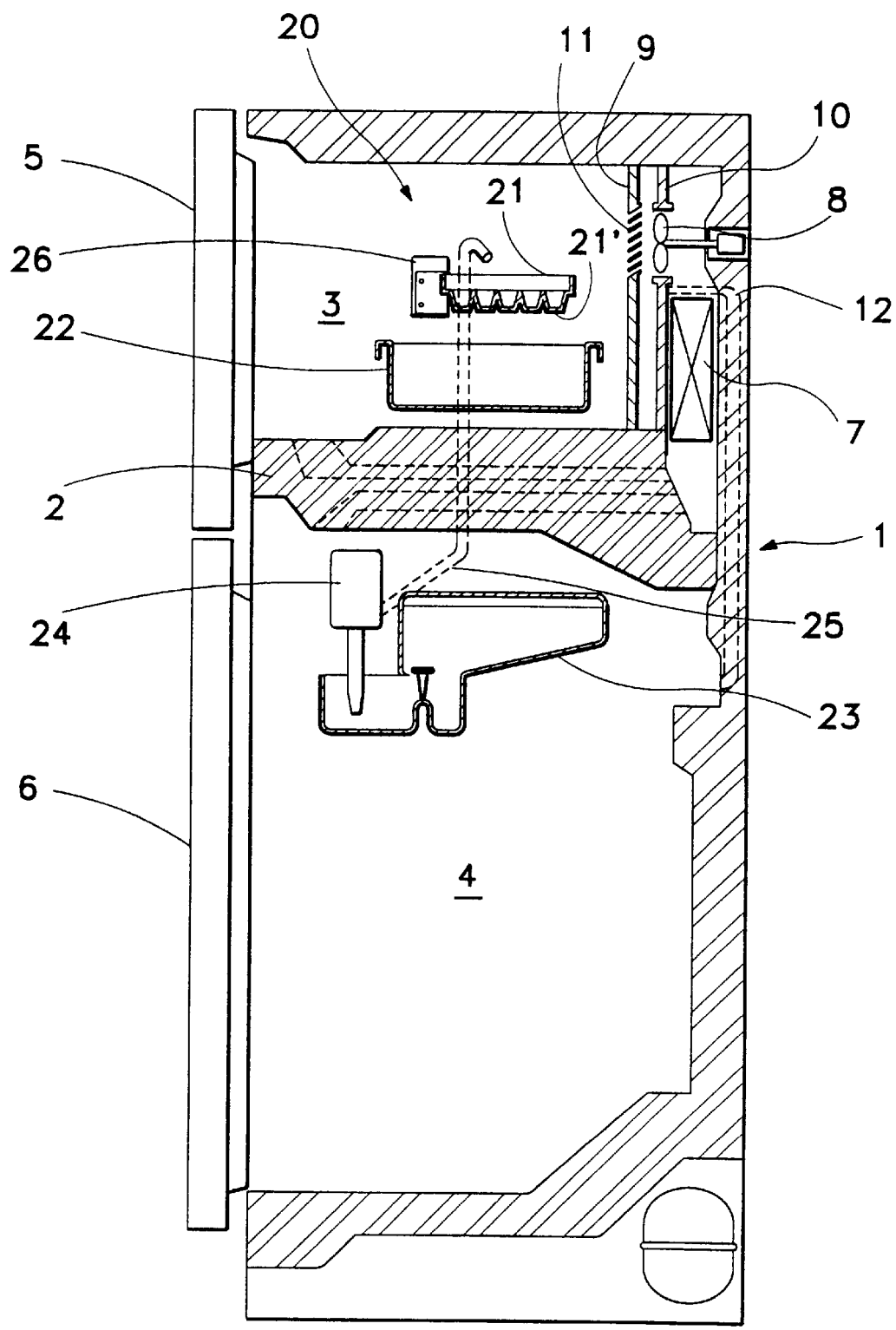
FIG. 4 is a longitudinal-sectional view of a refrigerator equipped with a conventional ice maker.
Figure 5:
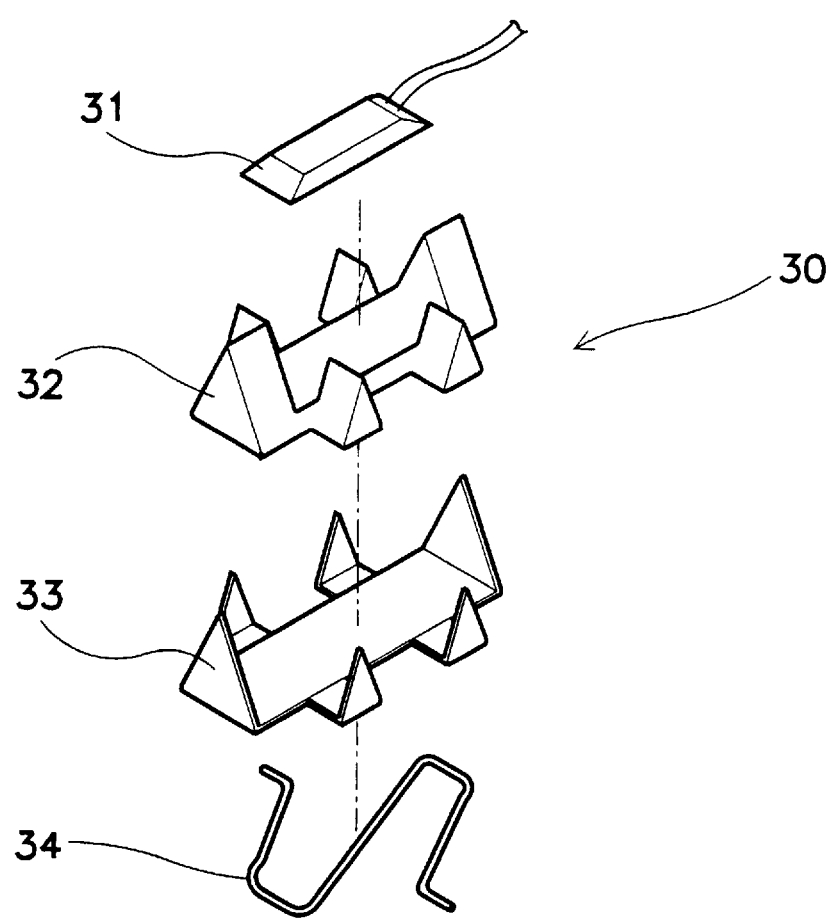
FIG. 5 is an exploded-perspective view of a conventional temperature sensor.
Figure 6:
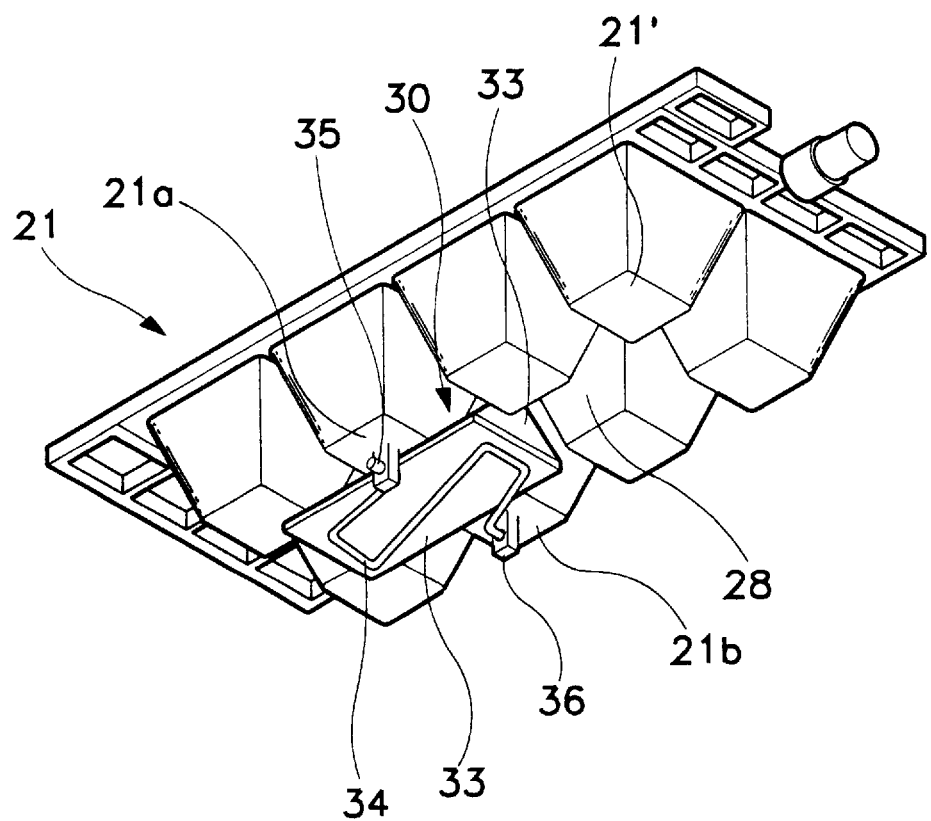
FIG. 6 is a perspective view of an ice making container having the temperature sensor of FIG. 5 attached to the underside of its base.

FIGS. 1A and 3A illustrate a different preferred embodiment. The housing 103A does not have the reinforcement 107 of the prior embodiment and the insulating member 102A is large in size so as t o fill up the housing 103A. Accordingly, the groove 55 accommodating the temperature-sensitive portion 101 is insulated from the cold air circulating the freezing compartment 3.

As described above, in the inventive temperature sensor for an ice maker, the coupling members used for joining the temperature sensor to an ice making container are integrally formed with the housing in which the temperature-sensitive portion and the insulating member are placed, thereby reducing the number of parts making up the temperature sensor.

The temperature sensor can be joined to or separated from the ice making container by simple manipulation, and it is convenient to manufacture. Additionally, the parts of the temperature sensor are made from flexible materials, so they are not damaged even if the action of twisting the ice making container to which the temperature sensor is attached is repeatedly performed.

Particularly, since the temperature-sensitive portion is deeply fitted in the groove formed between the outside surfaces of the concave portions and is encased in the insulating member, the cool air of the freezing compartment cannot contact the temperature-sensitive portion, allowing the temperature sensor to detect the temperature of the ice making container without error.

What is claimed is:

1. In combination, an ice making container adapter for use in a refrigerator, and a temperature sensor for sensing a temperature of the container;

the container including a plurality of concave portions for making individual ice cubes, and forming an exterior groove along its bottom between respective rows of the concave portions; two of the concave portions including respective bosses projecting downwardly from the bottom, the bosses forming eyes which are aligned with one another;

the temperature sensor including a temperature-sensitive element disposed in the groove, a housing disposed within the groove beneath the temperature-sensitive element when the container is in an upright position, said housing having a pair of ribs, each rib including a projection fitting into a respective one of the eyes, the ribs being elastically flexible to enable the projections to be inserted into, and removed from, the eyes.

2. The combination according to claim 1, wherein the temperature sensor further includes a thermal insulating member disposed between the housing and the temperature-sensitive element to prevent cold air from reaching the temperature-sensitive element.

3. The combination according to claim 2 wherein the housing includes a member pushing the insulating member upwardly against exterior walls of the concave portions.

4. The container according to claim 2 wherein the insulating member comprises a flexible material.

5. The combination according to claim 1 wherein each of the ribs includes a portion extending downwardly past its respective projection to enable a user's fingers to flex the rib.

6. The combination according to claim 1 wherein the ribs are disposed between the bosses.

* * * * *